United States Patent [19]

Venegas, Jr. et al.

[11] Patent Number: 5,364,077
[45] Date of Patent: * Nov. 15, 1994

[54] HANDRAIL ASSEMBLY

[75] Inventors: Frank Venegas, Jr., 4165 Homestead, Howell, Mich. 48843; Wayne A. Damitz, Union Lake, Mich.

[73] Assignee: Frank Venegas, Jr., Howell, Mich.

[*] Notice: The portion of the term of this patent subsequent to Dec. 15, 2009 has been disclaimed.

[21] Appl. No.: 938,446

[22] Filed: Aug. 28, 1992

Related U.S. Application Data

[63] Continuation-in-part of Ser. No. 799,338, Nov. 27, 1991, Pat. No. 5,170,996.

[51] Int. Cl.$^5$ .......................................... E04H 17/00
[52] U.S. Cl. .................................. 256/69; 256/65; 256/55; 403/260
[58] Field of Search ........................... 256/69, 65, 55; 403/260, 258, 230, 231

[56] References Cited

U.S. PATENT DOCUMENTS

| | | |
|---|---|---|
| 1,452,875 | 4/1923 | Healy . |
| 2,242,427 | 5/1941 | Heanue .................. 256/65 |
| 2,603,455 | 7/1952 | Welch . |
| 2,780,440 | 2/1957 | Krieger . |
| 2,927,513 | 3/1960 | Dove . |
| 2,946,568 | 7/1960 | Ogden . |
| 2,963,275 | 12/1960 | Meyers .................. 256/68 |
| 3,385,617 | 5/1968 | Gehring . |
| 3,519,292 | 7/1970 | Krikorian . |
| 3,776,520 | 12/1973 | Charles et al. . |
| 3,963,218 | 6/1976 | Glaesener . |
| 4,278,361 | 7/1981 | Steinke .................. 403/231 |
| 4,461,461 | 7/1984 | Caron . |
| 4,516,756 | 5/1985 | Beatty . |
| 4,540,160 | 9/1985 | Zanavich et al. . |
| 4,702,459 | 10/1987 | Moschner . |
| 4,750,713 | 6/1988 | Hirose . |
| 4,892,292 | 1/1990 | Russell . |
| 4,930,754 | 6/1990 | Caron et al. . |
| 4,953,830 | 9/1990 | Weaver, III . |
| 5,116,161 | 5/1992 | Faisst .................. 403/231 |
| 5,170,996 | 12/1992 | Venegas .................. 256/69 |

FOREIGN PATENT DOCUMENTS

| | | |
|---|---|---|
| 1141504 | 1/1969 | United Kingdom . |
| 2011007 | 7/1979 | United Kingdom . |

OTHER PUBLICATIONS

Drawing Specification for a Modular Rail System by the Spiratex Company, Feb. 11, 1991.

Primary Examiner—Randolph A. Reese
Assistant Examiner—Anthony Knight
Attorney, Agent, or Firm—Gifford, Groh, Sprinkle, Patmore and Anderson

[57] ABSTRACT

The handrail assembly includes at least one tubular metal stanchion, having a base and a hemispherical cap having a threaded receiver and at least a horizontal top rail. The horizontal top rail has an inner metal pipe, an outer plastic pipe, and at least one aperture for receiving the metal stanchion. Prior to assemblage, a threaded fastener is attached to the interior of the inner metal pipe opposite the aperture. In an alternative embodiment, the hemispherical cap on the stanchion is replaced by a threaded fastener and a threaded nut is positioned within the interior of the inner metal pipe opposite the aperture. Prior to insertion of the stanchion into the aperture, at least one tubular plastic sheath, having a first end conforming with the base of the stanchion and a second end conforming with the top horizontal rail, is slipped onto the tubular metal stanchion. Following placement of the top horizontal rail atop the stanchion, the sheath rests on the base of the stanchion and engages the top horizontal rail. The top horizontal rail is locked in position atop the stanchion by threading the threaded receiver and the threaded fastener together. Disassemblage of the handrail assembly is facilitated by the easy unthreading of the threaded receiver and the threaded fastener.

6 Claims, 4 Drawing Sheets

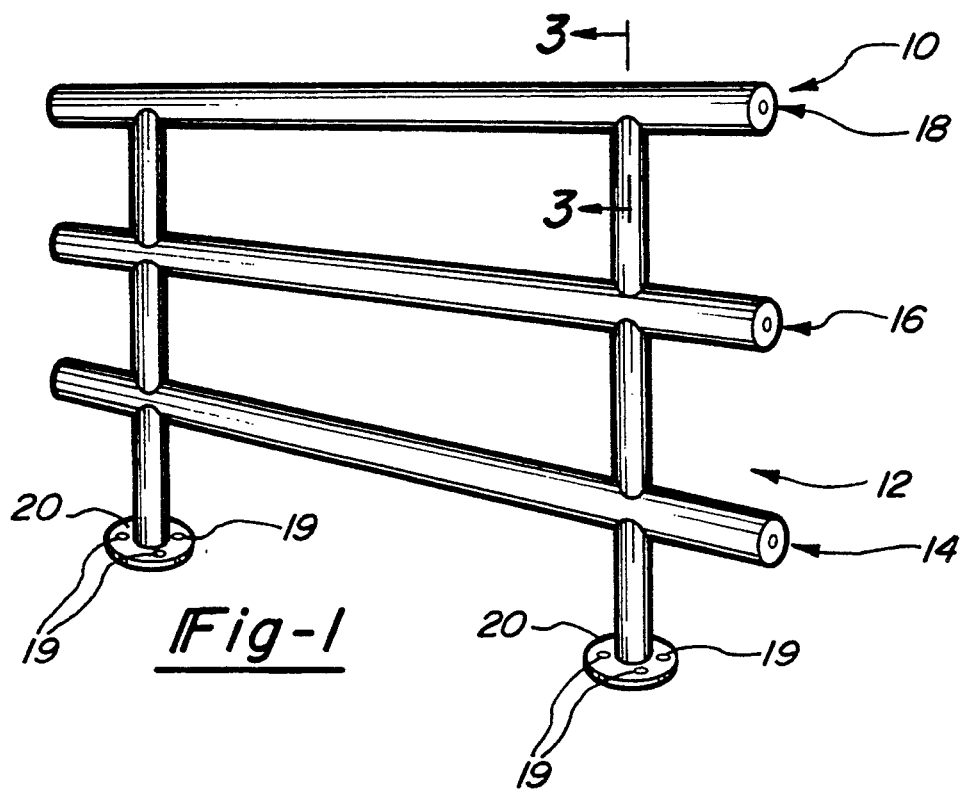
Fig-1
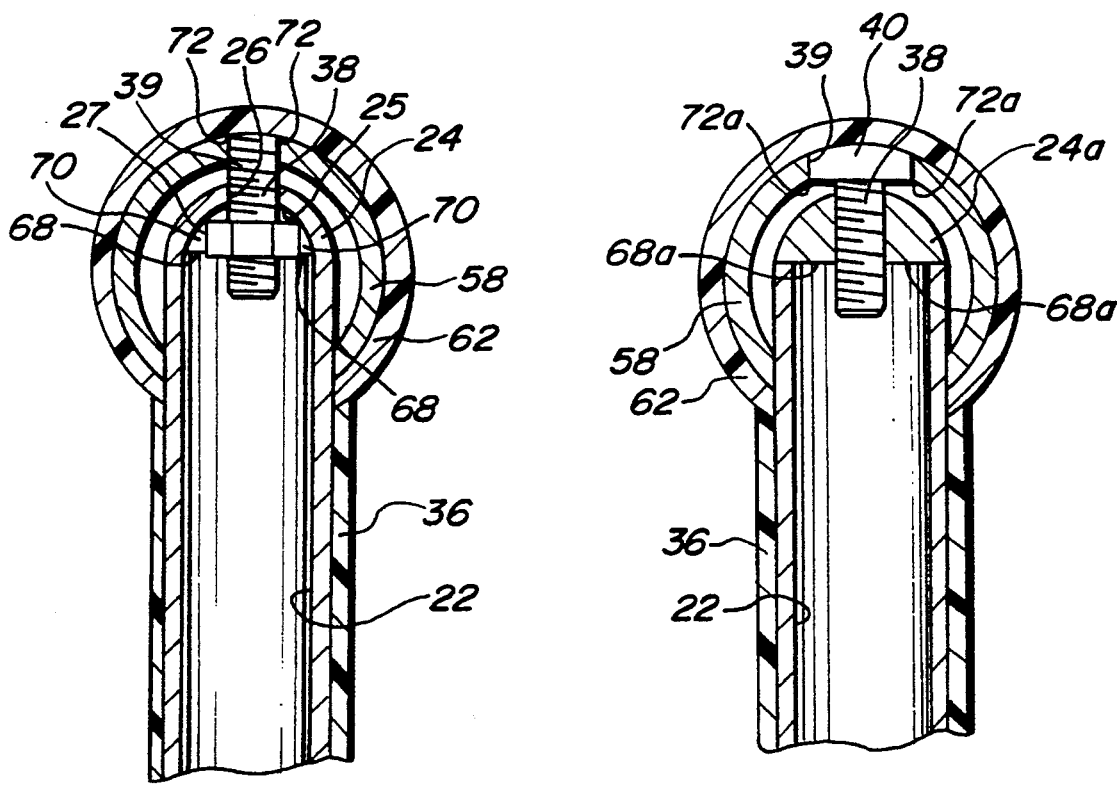
Fig-3
Fig-4

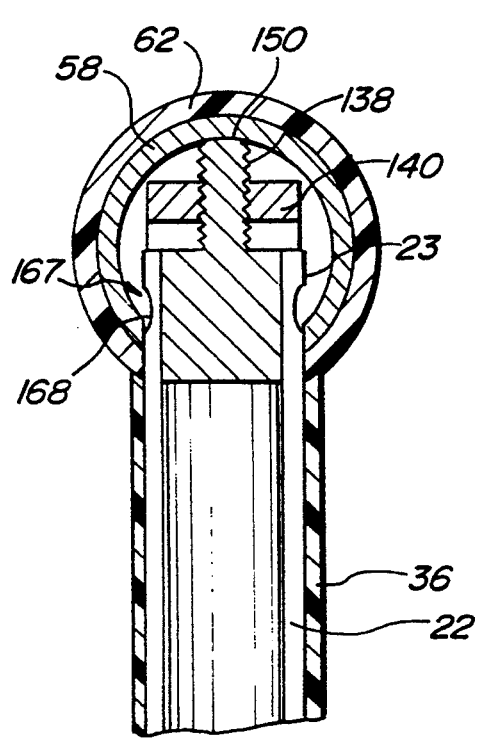
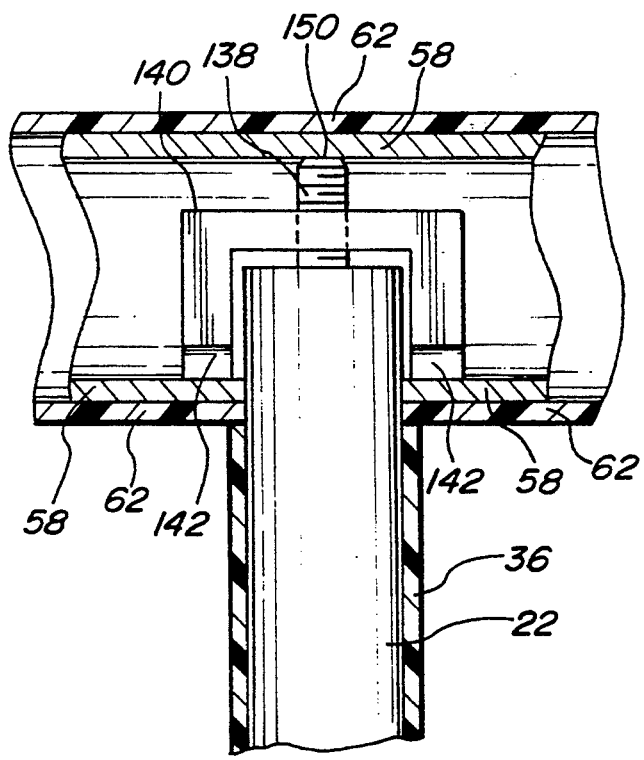
Fig-6  Fig-7
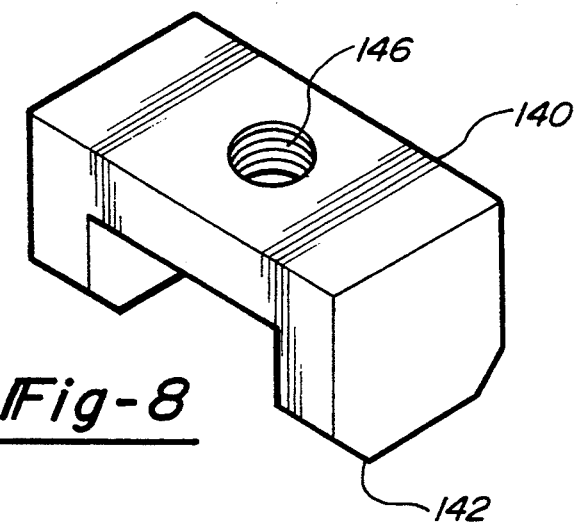
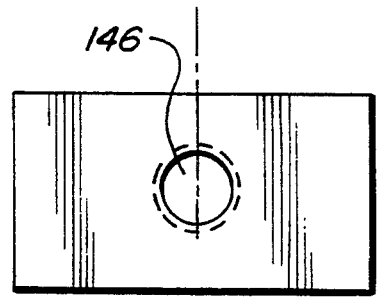
Fig-8  Fig-10
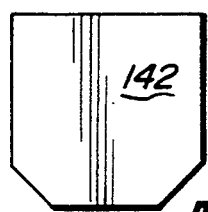
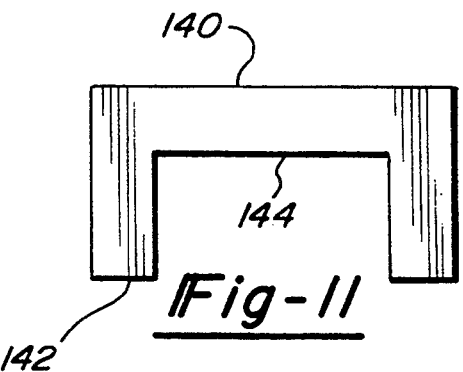
Fig-9  Fig-11

5,364,077

1

HANDRAIL ASSEMBLY

This is a continuation-in-part of application Ser. No. 07/799,338, filed Nov. 27, 1991, now U.S. Pat. No. 5,170,996.

BACKGROUND OF THE INVENTION

This invention generally relates to a handrail and, more particularly, to a unique rigid handrail assembly which can be quickly installed, dismantled, moved and reassembled, in factories, parking lots, stadiums, stairways, porches, balconies and the like.

Steel handrails are commonly used in factories and warehouses to direct pedestrian traffic and to protect workers from being hit by forklifts or other potentially damaging objects present in factories and warehouses. Steel handrails are also commonly used as railings for balconies of apartment buildings and athletic stadiums. In general, steel handrails are used in a variety of environments where it is desirable to control movement. While steel handrails are quite strong, they also generally are quite rigid and, therefore, do not possess high energy absorbing capabilities. Another disadvantage of steel handrails is that they require maintenance because they rust. An alternative to steel handrails are plastic handrails which, as compared with steel handrails, can be energy absorbing, are low maintenance, and also have the advantage of being easily color-coded. Unfortunately, plastic handrails do not provide the same strength that is a desirable characteristic of steel handrails. Therefore, it would be highly desirable to have available handrails which combine the respective desirable characteristics of plastic and steel handrails.

A common drawback to many currently available steel, plastic or steel/plastic handrail assemblies is that once they are assembled in one place, they essentially become fixtures in that location. Hence, although such handrail assemblies are common, they are not easily removed from one location and reassembled in another location. As a result, there exists a need for an improved handrail assembly which combines the desirable characteristics of plastic and steel handrail assemblies, yet allows the ready assemblage and disassemblage of such a handrail assembly.

SUMMARY OF THE INVENTION

The present invention provides a knockdown rail assembly which is readily and easily assembled and disassembled. The rail assembly includes at least one horizontal, tubular rail having an aperture defined therein and a vertical stanchion extended into the aperture. A fastener means on the horizontal, tubular rail and the stanchion threadably fastens the rail to the stanchion.

In a preferred embodiment, the present invention is a handrail assembly which includes a top horizontal rail having an inner metal pipe to which at least one threaded fastener is attached, an outer plastic pipe, and at least one aperture through one side of the rail, the aperture being positioned opposite the threaded fastener, and at least one vertically oriented support stanchion having a tubular metal post, a base where a lower end of the post is anchored to the base and an upper end of the post having a hemispherical cap containing an aperture. Following the slipping of at least one plastic tubular sheath having a first end conforming with the base and a second end conforming with the top horizontal rail over the exterior surface of the stanchion post, the stanchion post is fitted into the aperture of the top horizontal rail and the aperture of the hemispherical cap receives the threaded fastener. In one embodiment, the aperture in the hemispherical cap is threaded to allow the threading of the stanchion onto the threaded fastener to lock the top horizontal rail atop the stanchion. In an alternate embodiment, a threaded nut is attached to the interior of the hemispherical cap to allow threading of the stanchion onto the threaded fastener to lock the top horizontal rail atop the stanchion.

In a further alternative embodiment, the handrail assembly includes a top horizontal rail having an inner metal pipe in which at least one locking nut having a threaded aperture is positioned, an outer plastic pipe, and at least one aperture through one side of the rail, the aperture being positioned opposite the locking nut, and at least one vertically oriented support stanchion having a tubular metal post, a base where a lower end of the post is anchored to the base and an upper end of the post having a threaded fastener. Following the slipping of at least one plastic tubular sheath having a first end conforming with the base and a second end conforming with the top horizontal rail over the exterior surface of the stanchion post, the stanchion post is fitted into the aperture of the top horizontal rail and the threaded aperture of the locking nut receives the threaded fastener. Threading of the stanchion's threaded fastener into the threaded aperture of the locking nut locks the top horizontal rail atop the stanchion. The sheath is designed to rest on the base of the stanchion and to engage the top horizontal rail. The handrail assembly is disassembled by unthreading the stanchion and removing the above components. In other embodiments, a plurality of stanchions, sheaths and horizontal rails can be used. These and other objects, advantages and features of this invention will become apparent upon review of the following specification in conjunction with the drawings.

BRIEF DESCRIPTION OF THE DRAWINGS

FIG. 1 is a perspective view of the handrail assembly of the present invention;

FIG. 3 is a cross-sectional view showing a first embodiment, of the locking mechanism of the present invention taken along the lines III—III in FIG. 1;

FIG. 4 is a cross-sectional view showing a second embodiment of the locking mechanism of the present invention;

FIG. 6 is a cross-sectional view showing a third embodiment of the locking mechanism of the present invention;

FIG. 7 is a fragmentary cross-sectional view showing the locking mechanism shown in FIG. 6;

FIG. 8 is a perspective view of the locking nut of a third embodiment of the locking mechanism of the present invention;

FIG. 9 is a front view of the locking nut of a third embodiment of the locking mechanism of the present invention;

FIG. 10 is a side view of the locking nut of a third embodiment of the locking mechanism of the present invention; and FIG. 11 is an end view of the locking nut of a third embodiment of the locking mechanism of the present invention.

DETAILED DESCRIPTION OF THE PREFERRED EMBODIMENTS

Figure 2:
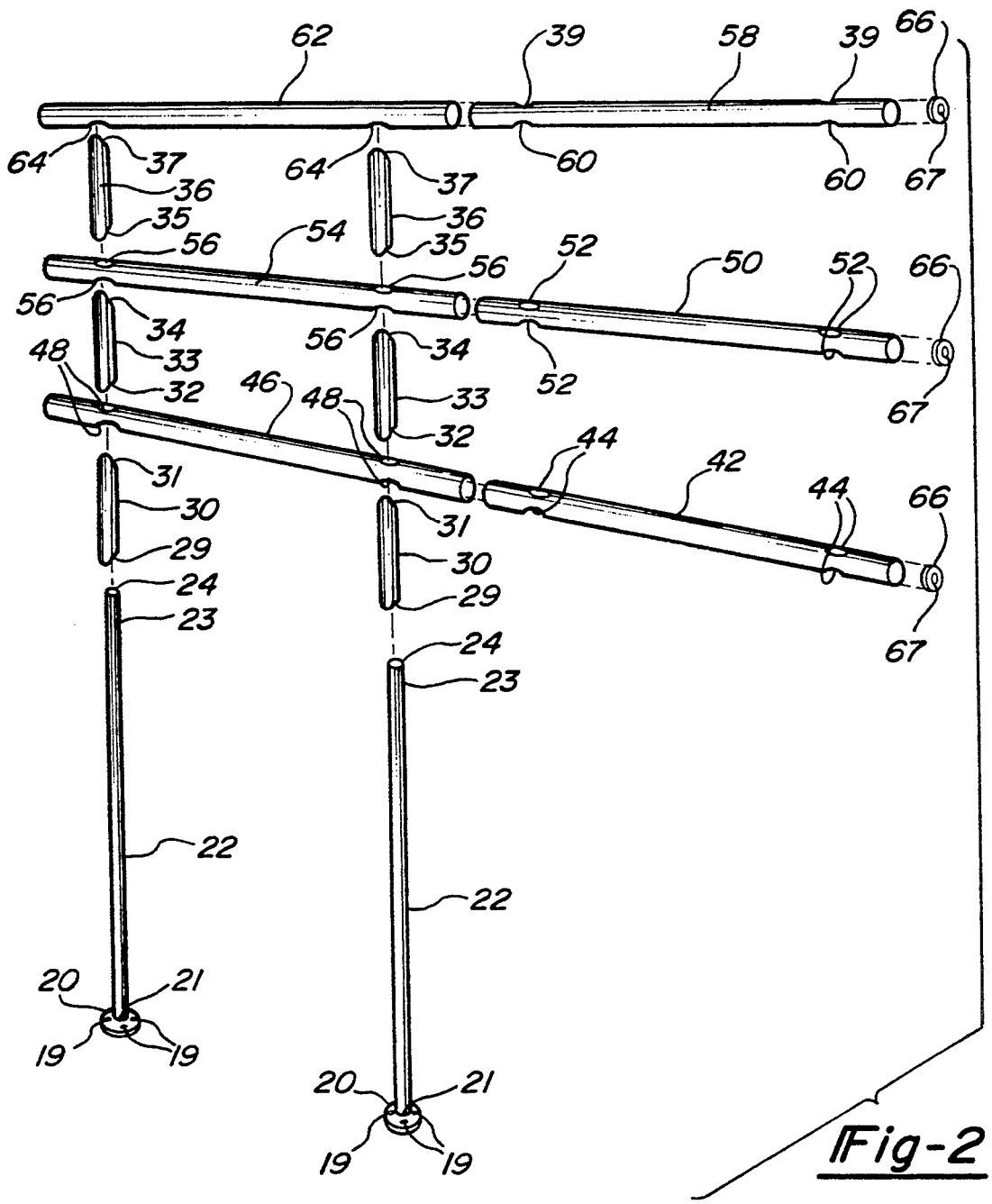
FIG. 2 is an exploded view of the handrail assembly of the present invention.

Referring now to the drawings and the embodiments illustrated therein, in which like numerals indicate like parts throughout the several views, FIG. 1 shows a handrail assembly 10 including a plurality of upright stanchions 12, a first horizontal rail 14, a second horizontal rail 16 and a top horizontal rail 18. As shown in FIG. 2, the plurality of upright stanchions 12 each include a base 20, a tubular metal post 22 having a lower end 21 and an upper end 23, a first tubular sheath 30, a second tubular sheath 33 and a third tubular sheath 36. As also shown in FIG. 2, first horizontal rail 14 includes a first metal pipe 42 having a plurality of apertures 44, and a first plastic pipe 46 having a plurality of apertures 48. Second horizontal rail 16 includes a second metal pipe 50 having a plurality of apertures 52, and a second plastic pipe 54 having a plurality of apertures 56. Top horizontal rail 18 includes a top metal pipe 58 having a plurality of apertures 60 and a top plastic pipe 62 having a plurality of apertures 64. As shown in FIG. 3, a hemispherical cap 24 having a receiving aperture 26 is attached to the upper end 23 of tubular metal post 22 by cap welds 68. A threaded receiving nut 27 is positioned on the interior side 25 of hemispherical cap 24 under receiving aperture 26 by receiving nut welds 70.

With reference to FIGS. 2 and 3, handrail assembly 10 is assembled by sliding first tubular sheath 30 onto post 22. Sheath 30 has a first end 29 conforming with base 20, a second end 31 conforming with first horizontal rail 14 and has interior dimensions which are greater than or equal to the exterior dimensions of post 22. After sheath 30 is slid onto post 22, first end 29 rests on base 20 of stanchion 12.

First horizontal rail 14 is formed by locating first metal pipe 42 in first plastic pipe 46. The plurality of apertures 44 of first metal pipe 42 are aligned with the plurality of apertures 48 of first plastic pipe 46 to allow the fitting of stanchion post 22 through the aligned apertures and the placement of first horizontal rail 14 onto stanchion post 22. After placement of first horizontal rail 14 onto stanchion post 22, second end 31 of first sheath 30 engages first horizontal rail 14 and first sheath 30 provides support for first horizontal rail 14.

Second sheath 33 has a lower end 32 conforming with first horizontal rail 14, an upper end 34 conforming with second horizontal rail 16, and has interior dimensions which are greater than or equal to the exterior dimensions of post 22. After sheath 33 is placed onto post 22, lower end 32 rests on first horizontal rail 14.

Second horizontal rail 16 is formed by locating second metal pipe 50 in second plastic pipe 54. The plurality of apertures 52 of second metal pipe 50 are aligned with the plurality of apertures 56 of second plastic pipe 54 to allow the fitting of stanchion post 22 through the aligned apertures and the placement of second horizontal rail 16 onto stanchion post 22. After placement of second horizontal rail 16 onto stanchion post 22, upper end 34 of second sheath 33 engages second horizontal rail 16 and second sheath 33 provides support for second horizontal rail 16.

Third sheath 36 has an inferior end 35 conforming with second horizontal rail 16, a superior end 37 conforming with top horizontal rail 18 and has interior dimensions which are greater than or equal to the exterior dimensions of post 22. After sheath 36 is slipped onto post 22, inferior end 35 rests on second horizontal rail 16.

Top metal pipe 58 is then inserted into top plastic pipe 62 to form top horizontal rail 18. The plurality of apertures 60 of top metal pipe 58 are then aligned with the plurality of apertures 64 of top plastic pipe 62. This alignment of apertures 60 with apertures 64 allows stanchion post 22 to be fitted into said aligned apertures and allows the positioning of top horizontal rail 18 onto stanchion post 22.

Prior to the assemblage of handrail assembly 10, a threaded fastener 38 is attached to the interior of top metal pipe 58 opposite apertures 60. When fitting stanchion post 22 into the aligned apertures of top horizontal rail 18, threaded fastener 38 is received by receiving aperture 26 of hemispherical cap 24. As shown in FIG. 3, threaded fastener 38 has been welded in place by fastener welds 72 in a fastener aperture 39 cut in top metal pipe 58. In an alternative embodiment shown in FIG. 4, threaded fastener 38 is held in place in top metal pipe 58 by a threaded fastener nut 40 which has been welded in place by fastener welds 72a in fastener aperture 39 of top metal pipe 58.

As shown in FIG. 3, threaded fastener 38 is reversibly held in position within receiving aperture 26 by receiving nut 27 which has been welded to the interior side 25 of hemispherical cap 24. In FIG. 4, a solid hemispherical cap 24a is attached to the upper end 23 of tubular metal post 22 by cap welds 68a. Cap 24a has threads for receiving threaded fastener 38 which dispenses with the need for receiving nut 27.

It is not essential that fastener aperture 39 be formed in top metal pipe 58. For example, in one preferred embodiment, a flathead machine screw can be welded to the interior of top metal pipe 58 opposite apertures 60. Regardless of the means by which threaded fastener 38 is held within receiving aperture 26 of hemispherical cap 24, it is important that the locking mechanism not allow the top horizontal rail 18 the opportunity to move slightly or "give" upon being struck by an object or grabbed, for example, by a human hand. Handrails are expected to be rigid. The locking mechanism of the present invention provides that rigidity.

Following the placement of the first, second and third sheaths and first, second and top horizontal rails on the stanchions, the threaded fastener 38 is threaded into the receiving nut 27 (FIG. 3) by rotating post 22 in a clockwise fashion. A plurality of endcaps 66 (FIG. 2) then may be used to cover the open ends of first horizontal rail 14, second horizontal rail 16 and top horizontal rail 18.

In the preferred embodiment of the present invention, first plastic pipe 46, second plastic pipe 54 and top plastic pipe 62 are slightly longer than first metal pipe 42, second metal pipe 50 and top metal pipe 58. The resulting overlap of first plastic pipe 46, second plastic pipe 54 and top plastic pipe 62 over first metal pipe 42, second metal pipe 50 and top metal pipe 58 creates a space at the end of first horizontal rail 14, second horizontal 16 and top horizontal rail 18 to receive endcaps 66. Because endcaps 66 are sized essentially to equal the interior dimensions of first plastic pipe 46, second plastic pipe 54 and top plastic pipe 62, endcaps 66 can be fitted to that space. Endcaps 66 contain an endcap aperture 67 to facilitate their removal.

Following the assemblage of handrail assembly 10, base 20 of stanchion 12 is bolted into the ground, i.e., concrete, with a plurality of bolts 19. The preferred expandable bolt for the installation is the RAWL-BOLT ™ available from The Rawl Plug Company, Inc., Two F. B. Powers Square, New Rochelle, N.Y. Installation involves the use of a hammer drill to drill holes in the concrete. Base 20 is then positioned over the holes and expandable bolts 19 are then driven into the holes by the hammer drill. A crescent or socket wrench is then used to tighten bolts 19. Following the proper positioning of stanchion post 22, handrail assembly 10 can be assembled.

Handrail assembly 10 of the present invention is strong enough to become a permanent fixture where it is erected. There are instances, however, when it would be beneficial to be able to move or remove a handrail. Removal of the present handrail assembly 10 simply involves the reversal of the above-listed assemblage steps. Specifically, stanchion base 20 is removed by untightening bolts 19 which are holding base 20 in the ground. Endcaps 66, if present, are pried loose and post 22 is rotated counterclockwise to unthread receiving nut 27 from threaded fastener 38 (FIG. 3). Top horizontal rail 18, third sheath 36, second horizontal rail 16, second sheath 33, first horizontal rail 14 and first sheath 30 can then be quickly and easily removed. These parts can then be moved to another location where handrail assembly 10 can be reassembled quickly and easily. The only new parts required are the expandable bolts 19. Where repair of a portion of handrail assembly 10 is required, the knockdown characteristics of the present invention facilitate the quick and easy maintenance of the damaged portion.

Figure 5:
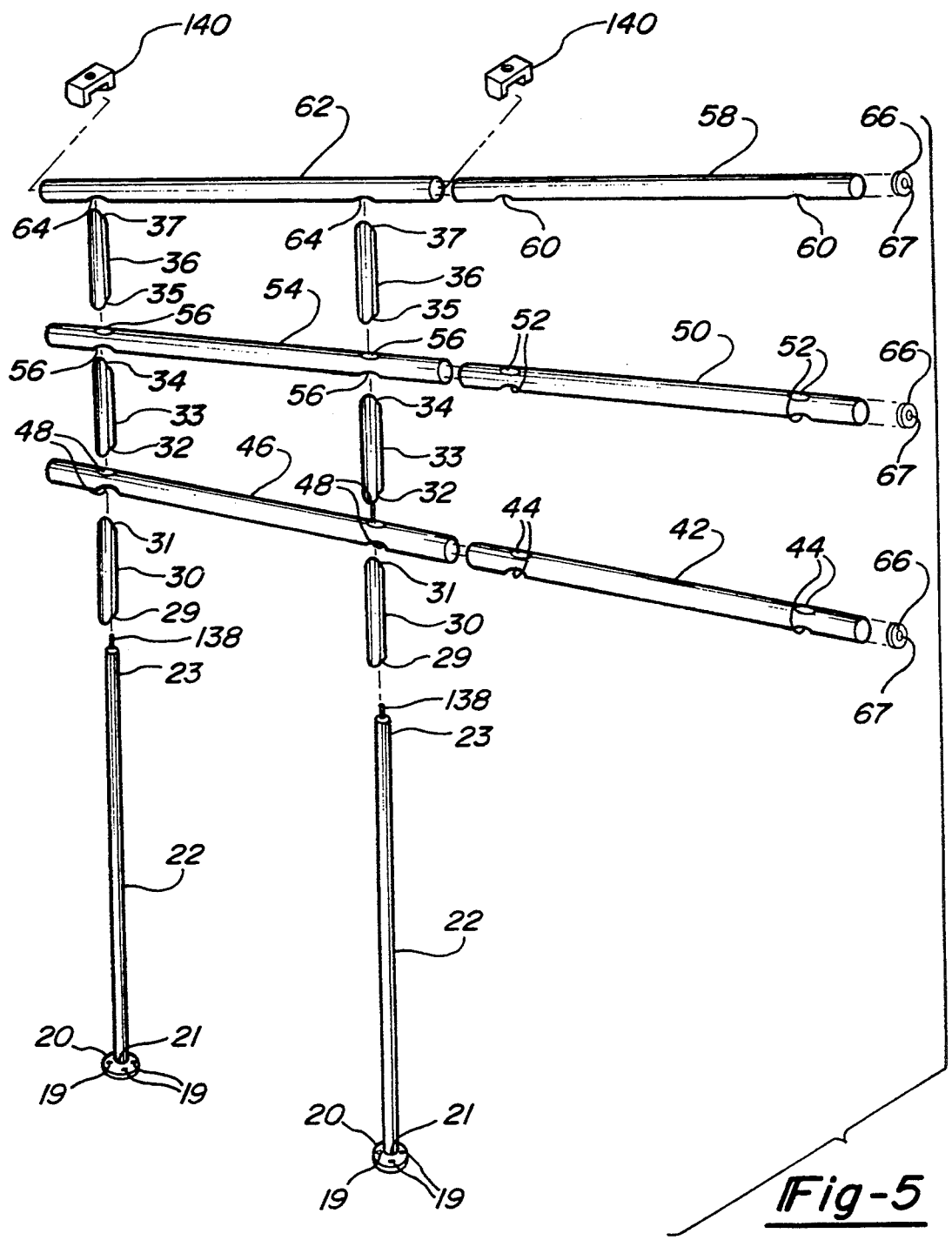
FIG. 5 is an exploded view of an alternative embodiment of the handrail assembly of the present invention.

In an alternative embodiment, as shown in FIG. 5, the plurality of upright stanchions 12 each include a base 20, a tubular metal post 22 having a lower end 21 and an upper end 23, a first tubular sheath 30, a second tubular sheath 33 and a third tubular sheath 36. As also shown in FIG. 5, first horizontal rail 14 includes a first metal pipe 42 having a plurality of apertures 44, and a first plastic pipe 46 having a plurality of apertures 48. Second horizontal rail 16 includes a second metal pipe 50 having a plurality of apertures 52, and a second plastic pipe 54 having a plurality of apertures 56. Top horizontal rail 16 includes a top metal pipe 58 having a plurality of apertures 60 and a top plastic pipe 62 having a plurality of apertures 64. As shown in FIG. 6, a threaded fastener 138 is attached to the upper end 23 of tubular metal post 22 by welds 168 made through apertures 167 through metal post 22.

With reference to FIGS. 5 and 6, handrail assembly 10 is assembled by sliding first tubular sheath 30 onto post 22. Sheath 30 has a first end 29 conforming with base 20, a second end 31 conforming with first horizontal rail 14 and has interior dimensions which are greater than or equal to the exterior dimensions of post 22. After sheath 30 is slid onto post 22, first end 29 rests on base 20 of stanchion 12.

First horizontal rail 14 is formed by locating first metal pipe 42 in first plastic pipe 46. The plurality of apertures 44 of first metal pipe 42 are aligned with the plurality of apertures 48 of first plastic pipe 46 to allow the fitting of stanchion post 22 through the aligned apertures and the placement of first horizontal rail 14 onto stanchion post 22. After placement of first horizontal rail 14 onto stanchion post 22, second end 31 of first sheath 30 engages first horizontal rail 14 and first sheath 30 provides support for first horizontal rail 14.

Second sheath 33 has a lower end 32 conforming with first horizontal rail 14, an upper end 34 conforming with second horizontal rail 16, and has interior dimensions which are greater than or equal to the exterior dimensions of post 22. After sheath 33 is placed onto post 22, lower end 32 rests on first horizontal rail 14.

Second horizontal rail 16 is formed by locating second metal pipe 50 in second plastic pipe 54. The plurality of apertures 52 of second metal pipe 50 are aligned with the plurality of apertures 56 of second plastic pipe 54 to allow the fitting of stanchion post 22 through the aligned apertures and the placement of second horizontal rail 16 onto stanchion post 22. After placement of second horizontal rail 16 onto stanchion post 22, upper end 34 of second sheath 33 engages second horizontal rail 16 and second sheath 33 provides support for second horizontal rail 16.

Third sheath 36 has an inferior end 35 conforming with second horizontal rail 16, a superior end 37 conforming with top horizontal rail 18 and has interior dimensions which are greater than or equal to the exterior dimensions of post 22. After sheath 36 is slipped onto post 22, inferior end 35 rests on second horizontal rail 16.

Top metal pipe 58 is then inserted into top plastic pipe 62 to form top horizontal rail 18. The plurality of apertures 60 of top metal pipe 58 are then aligned with the plurality of apertures 64 of top plastic pipe 62. This alignment of apertures 60 with apertures 64 allows stanchion post 22 to be fitted into said aligned apertures and allows the positioning of top horizontal rail 18 onto stanchion post 22.

In this embodiment, with reference to FIGS. 5, 6, 7, 8, 9, 10 and 11, prior to the assemblage of handrail assembly 10, a generally U-shaped threaded receiving nut 140 having a pair of legs 142 extending generally in the same direction from opposing edges of a web portion 144 is placed in the interior of top metal pipe 58 opposite aperture 60. Nut 140 is not fixed or welded to pipe 58 and is oriented so that legs 142 extend toward aperture 60 and web portion 144 is away from aperture 60. When fitting stanchion post 22 into the aligned apertures of top horizontal rail 18, threaded fastener 138 is received by a threaded receiving aperture 146 present in web 144 of nut 140. As shown in FIGS. 6 and 7, nut 140 is threaded onto fastener 138 until legs 142 of nut 140 abut the interior of top metal pipe 58 adjacent aperture 60 and the distal end 150 of fastener 138 abuts the interior of top metal pipe 58 opposite aperture 60.

When nut 140 completely engages fastener 138, legs 142 of nut 140 and distal end 150 of fastener 138 abut the interior of the top metal pipe 58 and the locking mechanism does not allow the top horizontal rail 18 the opportunity to move slightly or "give" upon being struck by an object or grabbed, for example, by a human hand. Handrails are expected to be rigid. The locking mechanism of the present invention provides that rigidity.

Following the placement of the first, second and third sheaths and first, second and top horizontal rails on the stanchions, the threaded fastener 138 is threaded into the receiving nut 140 (FIGS. 6 and 7) by rotating post 22 in a clockwise fashion. A plurality of endcaps 66 then may be used to cover the open ends of first horizontal rail 14, second horizontal rail 16 and top horizontal rail 18.

As with the alternative embodiments disclosed above, removal of the present handrail assembly 10 simply involves the reversal of the above-listed assemblage steps. Specifically, stanchion base 20 is removed by untightening bolts 19 which are holding base 20 in the ground. Endcaps 66, if present, are pried loose and post 22 is rotated counterclockwise to unthread receiving nut 140 from threaded fastener 138 (FIGS. 6 and 7). Top horizontal rail 18, third sheath 36, second horizontal rail 16, second sheath 33, first horizontal rail 14 and first sheath 30 can then be quickly and easily removed. These parts can then be moved to another location where handrail assembly 10 can be reassembled quickly and easily. The only new parts required are the expandable bolts 19. Where repair of a portion of handrail assembly 10 is required, the knockdown characteristics of the present invention facilitate the quick and easy maintenance of the damaged portion.

With respect to the preferred materials for use in the present invention, it is preferred that the first, second and top plastic pipes and the plastic sheaths be formed from high density polyethylene although other plastic materials may be used. Regarding the first, second and top metal pipes, the hemispherical cap and the stanchion posts and bases, it is preferred that they be formed from a metal selected from the group including steel, aluminum, and iron.

The above description is considered that of the preferred embodiment only. Modifications of the invention may occur to those of ordinary skill in the art. Therefore, it is understood that the embodiment shown in the drawings and described above is merely for illustrative purposes and is not intended to limit the scope of the invention, which is defined by the following claims as interpreted according to the principles of patent law.

The embodiments of the invention in which an exclusive property or privilege is claimed are defined as follows:

1. A rail assembly comprising: a vertical stanchion; at least one horizontal, tubular rail, said rail defining an aperture, said stanchion extending into said aperture; and
    fastener means on said horizontal tubular rail and said stanchion for threadably fastening said rail to said stanchion, said fastener means comprising:
    a threaded fastener on said stanchion, said fastener threadingly engaging said rail, said rail including a nut having a threaded aperture, said nut positioned within said rail in-line with said rail aperture;
    wherein said threaded fastener abuts the interior of said tubular rail opposite said rail aperture after threading said fastener completely into said threaded aperture.

2. A rail assembly as defined by claim 1 wherein said nut has a plurality of legs, said legs abutting the interior of said tubular rail adjacent said rail aperture after said threaded aperture of said nut completely engages said threaded fastener.

3. A knockdown handrail assembly comprising:
    at least one vertically oriented support stanchion, said stanchion including a tubular metal post having a lower end and an upper end, said upper post end including a threaded fastener;
    a top horizontal rail having a top plastic pipe and a top metal pipe, said top metal pipe having an outside dimension less than or equal to the inside dimension of said top plastic pipe, said top plastic pipe having at least one aperture through one side of said top plastic pipe, said top metal pipe having at least one aperture through one side of said top metal pipe;
    a nut having a threaded aperture positioned within said top metal pipe and opposite said apertures, said top metal pipe being located in said top plastic pipe such that said apertures in said respective pipes align with each other to allow fitting of said stanchion post into said aligned apertures whereby said stanchion post enters said aligned apertures and said threaded nut reversibly receives said fastener; and
    at least one hollow plastic tubular sheath having a first end and a second end, said second end engaging said top horizontal rail, and having interior dimensions which are greater than or equal to the exterior dimensions of said stanchion post such that said sheath can be slipped over and surround the exterior surface of said stanchion post;
    wherein said threaded fastener abuts the interior of said top horizontal rail opposite said rail aperture after threading said fastener completely into said threaded aperture.

4. A knockdown handrail assembly comprising:
    at least one vertically oriented support stanchion, said stanchion including a tubular metal post having a lower end and an upper end, said upper post end including a fastener;
    a first horizontal rail having a first plastic pipe and a first metal pipe, said first metal pipe having an outside dimension less than or equal to the inside dimension of said first plastic pipe, said first plastic pipe having at least one aperture through both sides of said first plastic pipe, said first metal pipe having at least one aperture through both sides of said first metal pipe, said first metal pipe being located in said first plastic pipe such that said apertures in said respective pipes align with each other to allow fitting of said stanchion post through said aligned apertures of said first horizontal rail and placement of said first horizontal rail onto said stanchion post;
    at least one first hollow plastic tubular sheath having a first end and a second end, said second end engaging said first horizontal rail, and having interior dimensions which are greater than or equal to the exterior dimensions of said stanchion post such that said first sheath can be slid over and surround the exterior surface of said stanchion post and support said first horizontal rail;
    a top horizontal rail having a top plastic pipe and a top metal pipe, said top metal pipe having an outside dimension less than or equal to the inside dimension of said top plastic pipe, said top plastic pipe having at least one aperture through one side of said top plastic pipe, said top metal pipe having at least one aperture through one side of said top metal pipe;
    receiving means for receiving a fastener positioned within said top metal pipe and opposite said apertures, said top metal pipe being inserted in said top plastic pipe such that said apertures in said respective pipes align with each other to allow fitting of said stanchion post into said aligned apertures of said top horizontal rail whereby said stanchion post enters said aligned apertures and said receiving means reversibly receives said fastener; and at least one second hollow plastic tubular sheath having a first end on said first horizontal rail, a second end engaging said top horizontal rail, and having interior dimensions which are greater than or equal to the exterior dimensions of said stanchion post such that said second sheath can be slipped over and surround the exterior surface of said stanchion post;

wherein said fastener abuts the interior of said top horizontal rail opposite said rail aperture after said receiving means reversibly receives said fastener.

5. A handrail assembly in accordance with claim 4 wherein said fastening means is a threaded fastener.

6. A handrail assembly in accordance with claim 5 wherein said threaded fastener is reversibly held in position in said aperture of said top metal pipe by a threaded nut positioned in the interior of said top metal pipe.

* * * * *